United States Patent
Izumi et al.

(10) Patent No.: US 7,171,084 B2
(45) Date of Patent: Jan. 30, 2007

(54) OPTICAL APPARATUS PROVIDED WITH DEMULTIPLEXING FUNCTION

(75) Inventors: Hirotomo Izumi, Yokohama (JP); Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 11/116,294

(22) Filed: Apr. 28, 2005

(65) Prior Publication Data

US 2005/0194514 A1 Sep. 8, 2005

Related U.S. Application Data

(63) Continuation of application No. PCT/JP03/05900, filed on May 12, 2003.

(51) Int. Cl.
*G02B 6/27* (2006.01)
(52) U.S. Cl. .......................... 385/47; 359/580
(58) Field of Classification Search ............... None
See application file for complete search history.

(56) References Cited

U.S. PATENT DOCUMENTS

| | | | |
|---|---|---|---|
| 5,930,045 A | 7/1999 | Shirasaki | |
| 5,969,865 A | 10/1999 | Shirasaki | |
| 6,028,706 A | 2/2000 | Shirasaki et al. | |
| 6,185,040 B1 | 2/2001 | Shirasaki et al. | |
| 6,646,805 B2 | 11/2003 | Mitamura et al. | |
| 6,900,940 B2 * | 5/2005 | Mitamura et al. | 359/580 |
| 2003/0058520 A1 * | 3/2003 | Yu et al. | 359/291 |

FOREIGN PATENT DOCUMENTS

| | | |
|---|---|---|
| EP | 1237308 | 9/2002 |
| JP | 9-43057 | 2/1997 |
| JP | 2000-111831 | 4/2000 |
| JP | 2000-511655 | 9/2000 |
| JP | 2000-288849 | 10/2000 |
| WO | 98/35259 | 8/1998 |
| WO | 99/9448 | 2/1999 |

OTHER PUBLICATIONS

Hirotomo Izumi et al., "Analysis of the incident beam of variable dispersion compensator using Virtually Imaged Phased Array", Collected Papers of Lecture of the Institute of Electronics, Information and Communication Engineers, 2002, vol. 1, c-3-39, p. 139.

(Continued)

*Primary Examiner*—Michelle Connelly-Cushwa
*Assistant Examiner*—Jerry T. Rahll
(74) *Attorney, Agent, or Firm*—Staas & Halsey LLP

(57) ABSTRACT

The present invention has an object to provide an optical apparatus of VIPA-type for achieving the reduction of the inter-channel loss deviation to realize a high accurate demultiplexing function. To this end, the optical apparatus according to the present invention comprises: a collimator lens converting an input light into a parallel light; a phase mask changing a phase of the parallel light from the collimator lens to change the intensity distribution into a shape different from the Gaussian distribution; a line focal lens condensing the light output from the phase mask onto a one-dimensional direction; and a VIPA plate multi-reflecting the light condensed by the line focal lens to emit the multi-reflected light.

11 Claims, 7 Drawing Sheets

OTHER PUBLICATIONS

Hirotomo Izumi et al., "A Design of Numerical Simulation for Variable Dispersion Compensator Using Virtually Imaged Phased Array", The Journal of the Institute Electronics, Information and Communication Engineers, C, vol. J85-C, No. 10, pp. 898-905.

Yuichi Kawahata et al., "Variable Dispersion Compensator Using Virtually Imaged Phased Array" The Journal of the Institute Electronics, Information and Communcation Engineers, C, vol. 86, No. 1, pp. 45-50.

M. Shirasaki et al., "Compensation of the chromatic Dispersion and Dispersion Slope using a Virtually Imaged Phased Array", Optical Fiber Communication Conference, pp. TuS1-1—TuS1-3.

Motoikazu Ohtsu, "Modern Optical Science I", 3$^{rd}$ copy, Asakura Shoten Co., pp. 108-127.

* cited by examiner

RELATED ART

OPTICAL APPARATUS PROVIDED WITH DEMULTIPLEXING FUNCTION

This application is a continuation of PCT/JP03/05900, filed on May 12, 2003.

FIELD OF THE INVENTION

The present invention relates to an optical apparatus provided with a function of demultiplexing a wavelength division multiplexed (WDM) light according to wavelengths, and in particular to an optical apparatus for demultiplexing a WDM light utilizing a virtually imaged phased array (VIPA).

DESCRIPTION OF THE RELATED ART

A wavelength division multiplexing (WDM) system is capable of transmitting mass data at a high speed, and accordingly, is applied to various optical communication systems. In a WDM optical communication system, a plurality of optical signals having different wavelengths, which are modulated based on required information, are multiplexed to a WDM light, to be transmitted from an optical sender to an optical receiver via a single optical transmission path. In the optical receiver, the received WDM light is demultiplexed according to the wavelengths, and the optical signals of respective wavelengths are detected. In the optical communication system, mass data is transmitted at a high speed by the transmission and reception of such a WDM signal light. Accordingly, the capability of the optical receiver for accurately demultiplexing the WDM light greatly influences the performance of the optical communication system. For example, even though a WDM light can be generated by multiplexing many carriers, if this WDM light cannot be demultiplexed accurately by the optical receiver, such a WDM light should not be transmitted. Therefore, the optical receiver is desired to have a high accurate demultiplexing function.

In response to such a demand, the applicant of the present invention has proposed various optical apparatuses utilizing a virtually imaged phased array (VIPA) which demultiplexes a WDM light to a plurality of optical beams that can be distinguished spatially, according to wavelengths (refer to patent literatures 1 to 3: Japanese Unexamined Patent Publication Nos. 7-43057 and 2000-28849, and Japanese National Publication No. 2000-511655).

Each of the VIPA-type optical apparatuses has the excellent performance capable of demultiplexing with the high accuracy optical signals of a plurality of wavelengths contained in the WDM light, but has a problem in that the loss deviation between the demultiplexed optical signals of respective wavelengths (to be referred to as inter-channel loss deviation) is large. The large inter-channel loss deviation means that, as the wavelength of the demultiplexed optical signal is away from a previously set designed center wavelength to a shorter wavelength side or a longer wavelength side, the deviation of the optical signal power to the designed center wavelength becomes large, thereby reducing the performance of the VIPA-type optical apparatus.

The present invention has been accomplished in view of the above problem and has an object to provide an optical apparatus of VIPA-type for achieving the reduction of the inter-channel loss deviation to realize a high accurate demultiplexing function.

SUMMARY OF THE INVENTION

In order to achieve the above object, the present invention provides an optical apparatus provided with a function of demultiplexing a WDM light according to wavelengths, comprising: a first lens converting an input light into a parallel light; a second lens condensing the parallel light converted by the first lens onto a one-dimensional direction; and an optical device having opposed parallel reflective planes in which the light condensed by the second lens is incident between the respective reflective planes in parallel to the planes, a part of the incident light is transmitted through one of the reflective plane to be emitted while the incident light being multi-reflected by the respective reflective planes, and the emitted lights interfere with each other to form a plurality of optical beams traveling directions of which are different from each other, according to wavelengths, wherein the apparatus further comprises an element changing an optical phase which is disposed between the first and second lenses, and the parallel light converted by the first lens is given to the second lens via the element.

In the above optical apparatus provided with the demultiplexing function, the element changing the optical phase is disposed between the first and second lenses, so that the intensity distribution of the light incident on the second lens is changed into a shape different from that of the Gaussian distribution. As a result, it becomes possible to make a diffraction image of the light which is focused onto the one-dimensional direction by the second lens and thereafter multi-reflected by the optical device of VIPA-type to have the desired intensity distribution, thereby enabling the reduction of the inter-channel loss deviation.

In the above optical apparatus provided with the demultiplexing function, it is preferable that the element changing the optical phase changes a phase of the parallel light converted by the first lens to adjust the intensity distribution of the light to be given to the second lens, so that a condensation image of the second lens approaches an inversed Fourier transform image of a target diffraction image of the light emitted from the optical device. To be specific, provided that a direction vertical to an optical axis direction of the light incident on the optical device from the second lens is y-axis, the intensity distribution of the condensation image of the second lens follows a function of $\sin(y)/y$ type. Thus, the intensity distribution of the diffraction image of the light which is multi-reflected within the optical device to be emitted, has an approximate rectangular shape, and accordingly, it becomes possible to effectively reduce the inter-channel loss deviation.

The other objects, features and advantages of the present invention will be apparent from the following description of the embodiments with reference to the accompanying drawings.

DETAILED DESCRIPTION OF THE INVENTION

Figure 1:
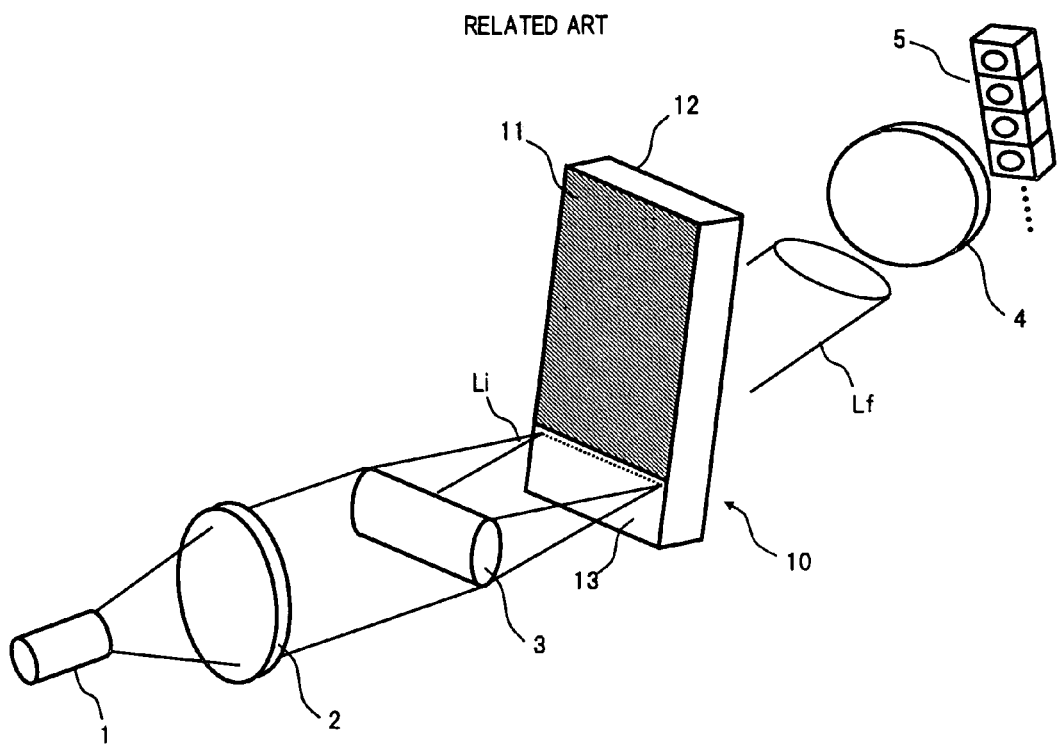
FIG. 1 is a perspective view showing a configuration example of a known VIPA-type wavelength demultiplexer.

Hereinafter, embodiments of an optical apparatus provided with a demultiplexing function according to the present invention will be described with reference to appended drawings. The same reference numerals denote the same or equivalent parts in all drawings.

Firstly, an operation theory of a known VIPA-type wavelength demultiplexer will be described, since it is useful for understanding the present invention. Note, the detailed content of the operation theory has been specifically recited in the patent literatures 1 to 3 described above. Therefore, herein, the basic content will be described.

Figure 2:
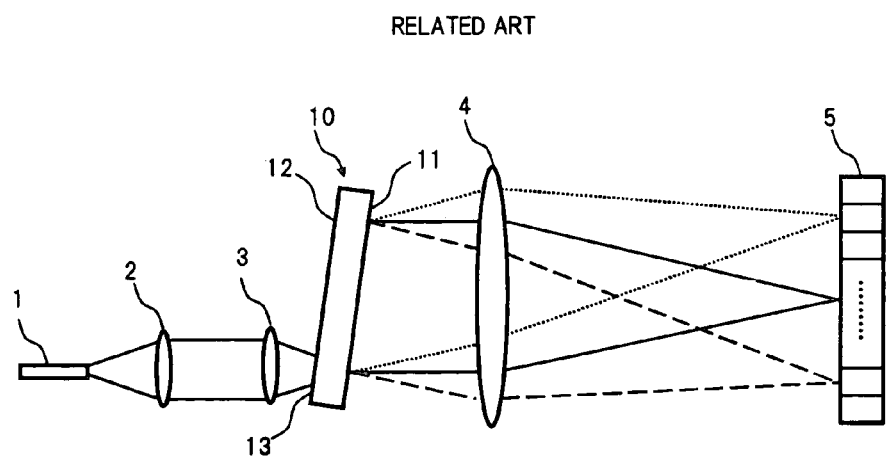
FIG. 2 is a side elevation view of the configuration example in FIG. 1.

In the known VIPA-type wavelength demultiplexer, as shown in a perspective view of FIG. 1 and a side elevation view of FIG. 2 for example, a WDM light emitted from one end of an input side optical fiber 1 is converted into a parallel light by a collimator lens 2 and, then, condensed on one segment by a line focal lens 3 (for example, a cylindrical lens, a refractive index profile lens or the like) and passes through a radiation window 13 of a VIPA plate 10 to be incident between opposed parallel planes. The incident light Li on the VIPA plate 10 is multi-reflected repeatedly, for example, between a reflective multilayer film 11 formed on one plane of the VIPA plate 10 and having the reflectance lower than 100% (preferably, about 95 to 98%) and a reflective multilayer film 12 formed on the other plane and having the reflectance of approximately 100%. At this time, every time the incident light is reflected on the surface of the reflective multilayer film 11, a few % of the light is transmitted through the surface to be emitted outside the VIPA plate 10. An optical axis of the incident light Li is inclined from a vertical incident angle to the VIPA plate 10, so that the light which is extended by reciprocating for one time between the reflective multilayer films 11 and 12 is not leaked out from the radiation window 13.

The lights transmitted through the VIPA plate 10 interfere to each other and form a plurality of optical beams Lf (only one beam is shown in the figure) traveling directions of which are different from each other, according to wavelengths. As a result, if the optical beams Lf are condensed on one point by a convergent lens 4, the condensed position moves on a straight line according to a change in the wavelength. If, for example, a fiber array 5 in which a plurality of output side optical fibers is arrayed, is disposed on the straight line, optical signals which are demultiplexed for each wavelength can be introduced to the respective output side optical fibers.

Figure 3:
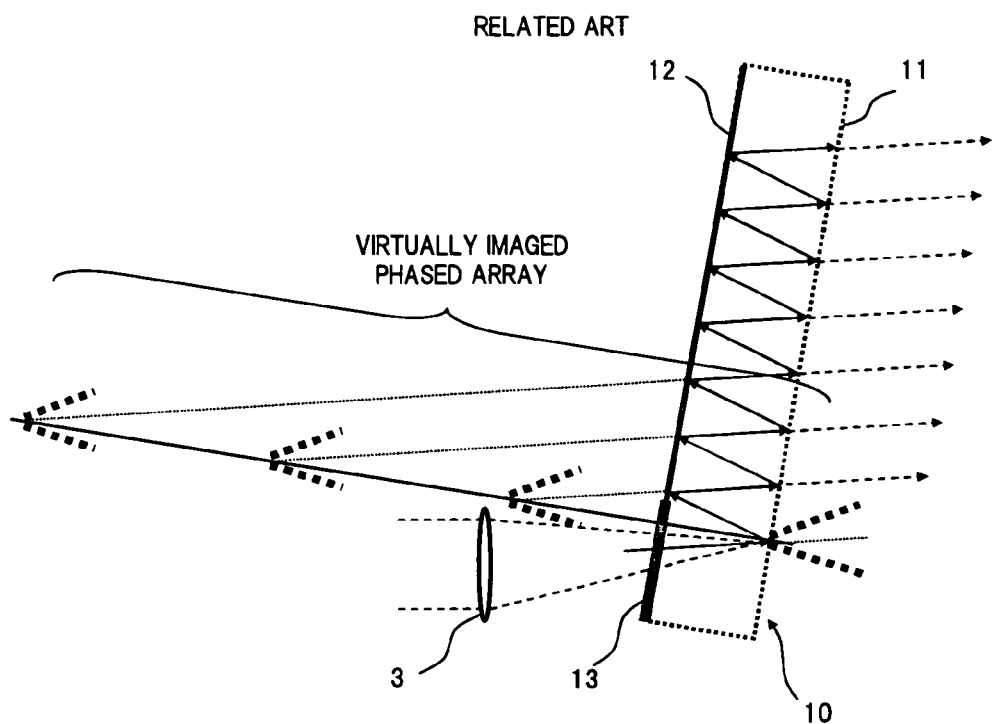
FIG. 3 is a diagram showing a model for explaining an operation theory of a known VIPA.
Figure 4:
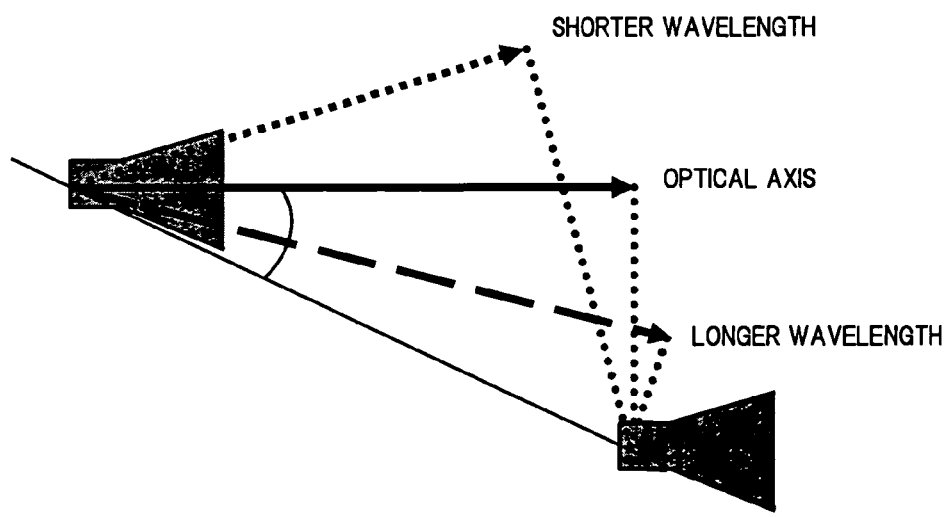
FIG. 4 is a diagram showing a model for explaining an interference condition in the known VIPA.

In consideration of a model as shown in FIG. 3 for example, behavior of the light that is multi-reflected by the VIPA plate 10 as described above is similar to that in an Echelon grating that is well-known as a step-wise diffraction grating. Therefore, the VIPA plate 10 can be considered as a virtual diffraction grating. Further, in consideration of an interference condition in the VIPA plate 10 based on a model as shown in FIG. 4 for example, the emitted light interferes under a condition in which, with an optical axis thereof as a reference, a shorter wavelength is above the optical axis and a longer wavelength is below the optical axis. Therefore, among the plurality of optical signals contained in the WDM light, the optical signals on the shorter wavelength side are emitted above the optical axis and the optical signals on the longer wavelength side are emitted below the optical axis.

Here, the behavior of the light in the VIPA plate 10 will be formulated.

Figure 5:
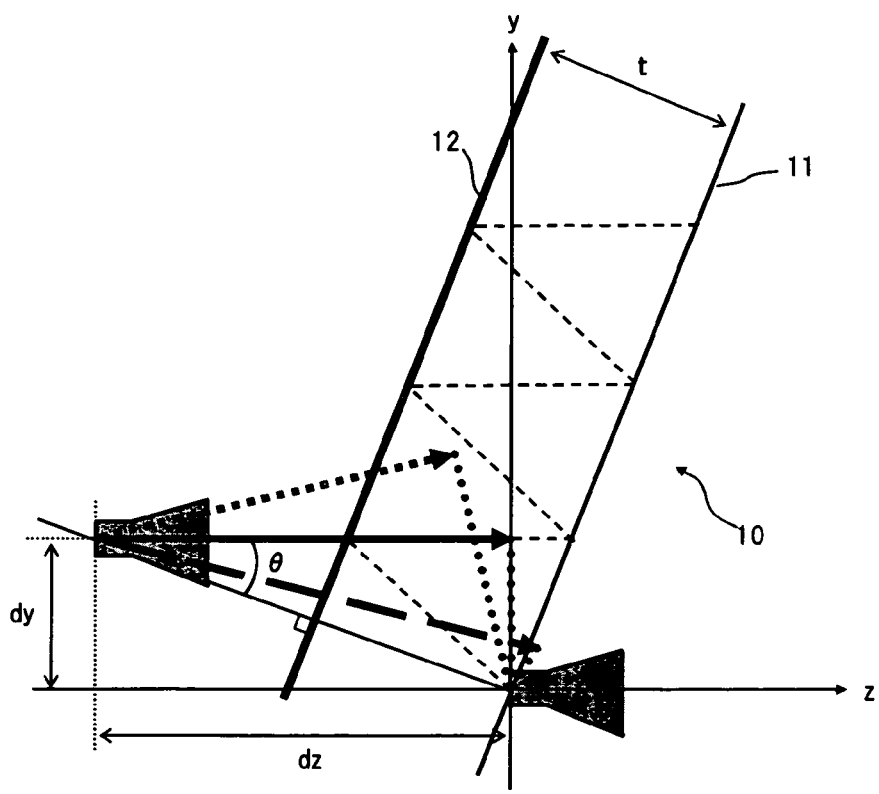
FIG. 5 is a diagram showing a coordinate system for formulating behavior of a light in the known VIPA.

As shown in FIG. 5 for example, provided that an optical axis direction of the incident light Li on the VIPA plate 10 is z-axis and an axis vertical to z-axis is y-axis, the consideration is made on the behavior of the light on z=0 at which the incident light Li is firstly reflected by the reflective multilayer film 11. It can be considered that the incident light Li is multi-reflected within the VIPA plate 10 so that the lights on z=0 are uniformly arranged, and further, the respective lights are those from a plurality of Gaussian beams whose amplitudes are decreased in geometric series. Therefore, the above described Gaussian beam is represented by the next formula (1).

$$E(y, z) = \left(\sqrt{\frac{2}{\pi}} \frac{1}{\omega(z)}\right)^{\frac{1}{2}} \exp\left(-\frac{y^2}{\omega_y^2}\right) \exp\left(-iKz\left(1 + \frac{y^2}{2z^2}\right)\right) \quad (1)$$

In the above formula, $$\omega(z) = \omega(y)\sqrt{1 + \left(\frac{\lambda z}{\pi \omega_y^2}\right)^2},$$

and $\omega_y$ is the radius of a beam waist size, and K is a wave vector.

In the light reflected within the VIPA plate 10 for j times in accordance with the formula (1), the beams each having the intensity distribution of Gaussian function type are virtually arranged on positions shifted by j-times of dz=2t·cos θ and by j-times of dy=2t·sin θ (t is a distance between the reflective multilayer films 11 and 12, and θ is an inclination angle of the VIPA plate 10), in a z-direction and a y-direction. Accordingly, a virtual image of the light reflected for j times can be represented by the next formula (2).

$$E_j(y - jdy, z + jdz) = \quad (2)$$

$$\left(\sqrt{\frac{2}{\pi}} \frac{1}{\omega(z + jdz)}\right)^{\frac{1}{2}} \exp\left(-\frac{(y - jdy)^2}{\omega_y^2}\right) \exp\left(-iKz\left(1 + \frac{(y - jdy)^2}{2(z + jdz)^2}\right)\right)$$

Utilizing the relationship in the formula (2) and provided that a reflection coefficient of the reflective multilayer film 11 is r, a complex amplitude amount $T_{out}(y)$ distributed in the y-direction of the light emitted from the above virtual diffraction grating can be described by the next formula (3).

$$T_{out}(y) = t \sum_{j=0}^{\infty} r^j E_j(y - jdy, 0 + jdz) \qquad (3)$$

If the formula (3) is rearranged using the Fourier transform shown in the next formula (4) provided that the wave number in the y-direction is $k_y$, in order to make the formula (3) clearer, a relationship as shown in the formula (5) can be obtained.

$$E(k_y) = \int E(y) \exp(ik_y y) dy \qquad (4)$$

$$\hat{T}_{out}(k_y) = \qquad (5)$$

$$t\sqrt{2i}\sqrt[4]{\pi\omega_y^2} \frac{\exp\left(-\frac{\omega_y^2 k_y^2}{4}\right)}{\sqrt{(1-r)^2 + 4r\sin^2(\phi/2)}} \exp\left(i\tan^{-1}\left(\frac{r\sin\phi}{1-r\cos\phi}\right)\right)$$

When the above formula (5) is derived, this discussion is assumed to be within a range where the paraxial approximation ($k_z$ is the wave number in the z-direction) shown in the next formula (6) is established. Further, Fresnel integral as shown in the formula (7) and relationships shown in the formula (8) and the formula (9) are respectively used.

$$k_z = \sqrt{K^2 - k_y^2} \approx K\left(1 - \frac{k_y^2}{2K^2}\right) \qquad (6)$$

$$\int \exp(-i\alpha^2 x^2) dx = \frac{\sqrt{\pi}}{|\alpha|} \exp\left(-i\frac{\pi}{4}\right) \qquad (7)$$

$$\sum_{n}^{\infty} x^n = \frac{1}{(1-x)} \qquad (8)$$

$$\phi \equiv k_y dy - k_z dz \qquad (9)$$

Then, if a squared absolute value is obtained for the formula (5), a relationship shown in the next formula (10) can be obtained.

$$|\hat{T}_{out}(k_y)|^2 = t^2 \sqrt{\frac{\omega_y^2}{2\pi}} \frac{\exp\left(-\frac{\omega_y^2 k_y^2}{2}\right)}{(1-r)^2 + 4r\sin^2(\phi/2)} \qquad (10)$$

Incidentally, it has been known that the following relationship is established in a diffraction image (optical intensity) of the diffraction array (refer to "Modern Optical Science I", by Motokazu OHTSU, third copy, Asakura Shoten Co., September 1997, p. 118 to 120).

"Diffraction image∝Fourier transform image (diffraction image) of slit×characteristic of interference fringe"

Figure 7:
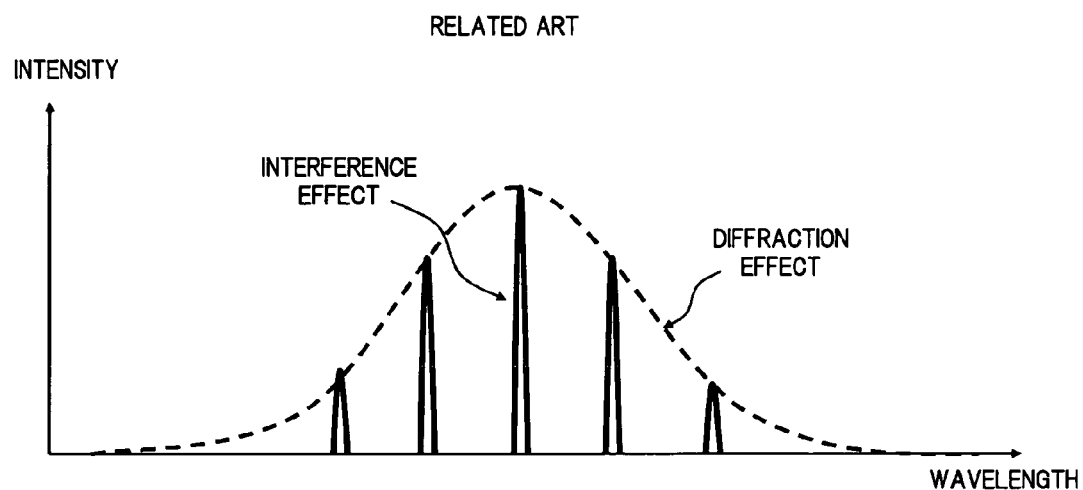
FIG. 7 is a graph showing one example of the intensity distribution of a diffraction image of the light emitted from the known VIPA.

Considering the above relationship, the relationship shown in the formula (10) indicates that the Gaussian intensity modulation is made due to an effect of diffraction (exponential term on the right-handed numerator side), and further, an interference effect describable by Airy formula $((1-r)^2 + 4r\sin^2(\phi/2)$ term on the right-handed denominator side) occurs therein. Accordingly, the diffraction image of the light emitted from the VIPA plate 10 shows the intensity distribution shown in FIG. 7 for example.

Figure 6:
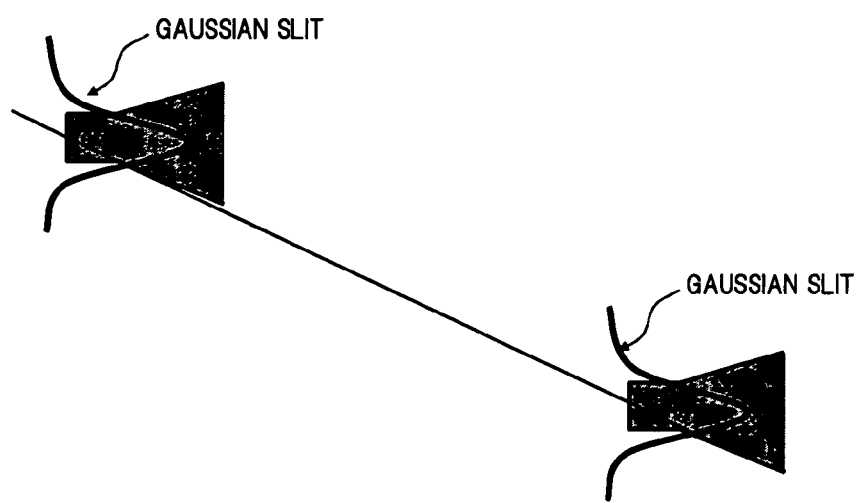
FIG. 6 is a conceptual diagram for explaining a function of the known VIPA.
Figure 8:
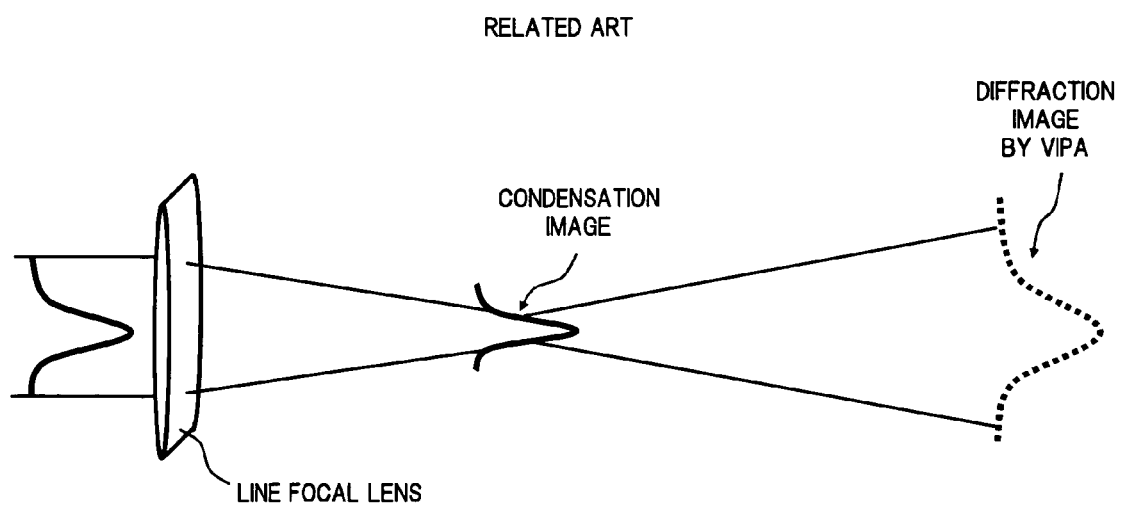
FIG. 8 is a conceptual diagram for explaining an operation of the known VIPA.

According to the above described content, the reason why the emitted light from the VIPA plate 10 is subjected to the Gaussian modulation is that the VIPA plate 10 has the function as the diffraction array in which Gaussian slits are arrayed (refer to FIG. 6), and this Gaussian slit can be explained from that the light incident on the line focal lens 3 is condensed in a state of having the Gaussian intensity distribution (amplitude). Namely, the diffraction image of the light emitted from the VIPA plate 10 is subjected to the intensity modulation corresponding to the Fourier transform image of slit shape. Specifically explaining this fact with reference to a conceptual diagram of FIG. 8, the diffraction image (right side in FIG. 8) of the emitted light which is obtained by multi-reflecting, by the VIPA plate 10, the condensation image (center in FIG. 8) of the light having the Gaussian distribution (left side in FIG. 8) by the line focal lens 3, has also the distribution of Gaussian function type.

Therefore, the present invention pays an attention to the modulation effect as described above, and provides a technology for using a characteristic of the slit which is not fixed in hardware in the VIPA plate type configuration, thereby enabling the realization of the modulation in which the loss deviation between the optical signals of respective wavelengths emitted from the VIPA plate 10 is reduced. The basic consideration thereof is in that an assumption is made on a state where the diffraction image of the emitted light from the VIPA plate 10 is subjected to the modulation of desired shape, an inverse Fourier transform image of the diffraction image is obtained, and a phase of the light incident on the line focal lens 3 is converted so that the image of the light condensed in a one-dimensional direction by the line focal lens 3 approaches the inverse Fourier transform image or preferably becomes substantially equal to the inverse Fourier transform image.

There will be described specific embodiments of the optical apparatus provided with the demultiplexing function according to the present invention.

Figure 9:
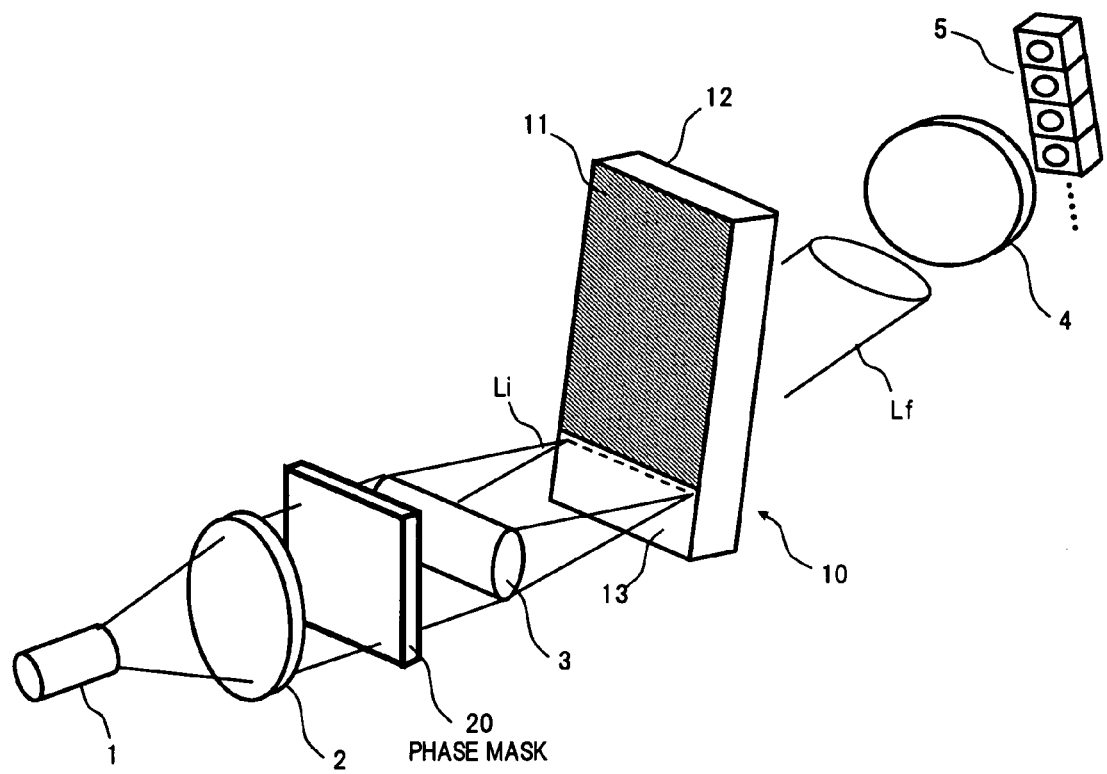
FIG. 9 is a perspective diagram showing a configuration example of a VIPA-type wavelength demultiplexer according to one embodiment of the present invention.

FIG. 9 is a perspective view showing a configuration of one embodiment of a VIPA-type wavelength demultiplexer to which is applied the present invention. Further, FIG. 10 is a side elevation view of the configuration in FIG. 9.

Figure 10:
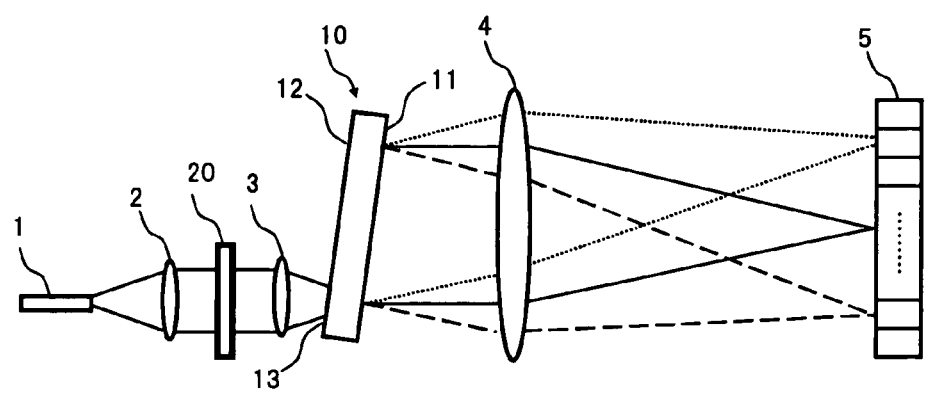
FIG. 10 is a side elevation view of the configuration example in FIG. 9.

The VIPA-type wavelength demultiplexer shown in FIG. 9 and FIG. 10 is configured so that, in the known configuration shown in FIG. 1 and FIG. 2, a phase mask 20 as an element changing the optical phase is inserted between the collimator lens 2 and the line focal lens 3. The configuration other than the phase mask 20, that is, the input side optical fiber 1, the collimator lens 2 (a first lens), the line focal lens 3 (a second lens), the VIPA plate 10, the convergent lens 4 (a third lens) and the output side fiber array 5, is same as the known configuration.

The phase mask 20 is a known optical element which controls a phase of the parallel light transmitted through the collimator lens 2, to convert the intensity distribution of the light input to the line focal lens 3 into a desired shape different from the Gaussian distribution. The intensity distribution of the light transmitted through the phase mask 20 is designed so that an image of the light condensed in the one-dimensional direction by the line focal lens 3 becomes substantially equal to a function f(y).

Figure 11:
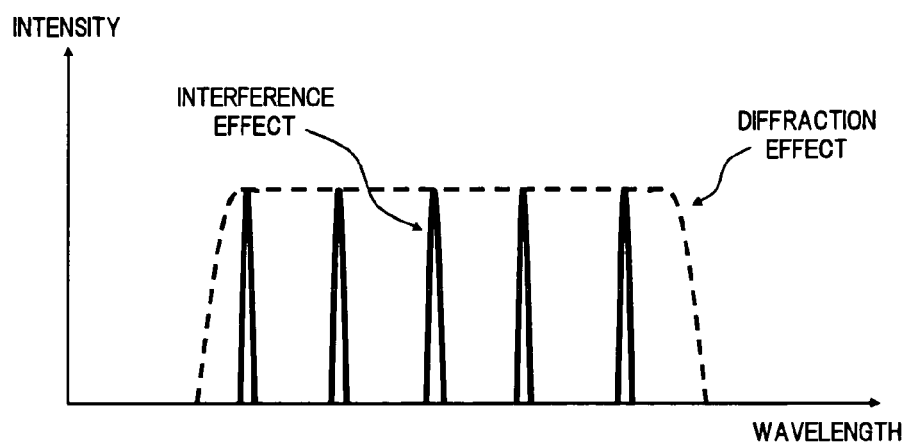
FIG. 11 is a graph showing one example of the intensity distribution of a diffraction image of a light emitted from a VIPA in the embodiment of the present invention.

The above described function f(y) is a function corresponding to the inverse Fourier transform image of the target diffraction image of the light emitted from the VIPA plate 10. To be specific, as shown in FIG. 11 for example, in the case where the rectangular intensity distribution in which the inter-channel loss deviation becomes substantially 0 is assumed as the target diffraction image, the function f(y) corresponding to the inverse Fourier transform image of such a diffraction image is a sin(y)/y type. In order that the condensation image of the line focal lens 3 becomes substantially equal to sin(y)/y, the intensity distribution of the light transmitted through the phase mask 20 to be input to the line focal lens 3 needs to have approximately a rectangular shape.

As the phase mask 20 for converting the light having the Gaussian distribution into the light having the intensity distribution near the rectangular shape, it is possible to utilize a known phase mask as disclosed in Japanese Unexamined Patent Publication No. 8-57678. The phase mask disclosed in this publication is applied to a laser processing apparatus. In this laser processing apparatus, in order to avoid a problem in that, in the case where a processing object of uneven thickness is processed by a beam of the Gaussian distribution, the energy supply in the vicinity of the beam center becomes excessive to damage a base of the processing object, the intensity distribution of the beam is converted using the phase mask from the Gaussian distribution into the distribution having a cross section of approximately rectangular shape, to prevent the poor processing.

Here, a function of the phase mask 20 will be briefly described.

A typical phase mask functions in accordance with a principle similar to the hologram, and accordingly, if Fraunhofer diffraction approximation is established, a transmission function (transmission image) on the hologram can be obtained by the inverse Fourier transform of a regenerated image. This means that the image of the light immediately after transmitted through the phase mask 20 may become the inverse Fourier transform image of the desired condensation image of the line focal lens 3. Information of the inverse Fourier transform can be replaced with the optical path length in the phase mask 20.

Therefore, in the case where, as a basic configuration of the phase mask, there is applied a configuration in which a substrate having the substantially uniform refractive index, such as silica glass, is used, and the thickness of the substrate in a propagation direction of the light is made uneven in spatial, a convexo-concave structure corresponding to the information of the inverse Fourier transform is formed on the substrate utilizing the mask exposure, the reactive ion etching or the like, thereby enabling the designing of the phase mask for giving a desired phase change to the transmitted light. To be specific, in one example shown in FIG. 11, the inverse Fourier transform of the function of sin(y)/y type obtained as the condensation image of the line focal lens 3 is calculated, and the calculation result is replaced with the optical path length to design the convexo-concave structure of the silica glass substrate, thereby producing the phase mask 20.

Further, it is preferable that optical incident and emission planes of the phase mask 20 are subjected to the non-reflective coating. As a result, a phase of the transmitted light can be made constant. Moreover, it is desirable that a temperature control function such as a heater is disposed on the phase mask 20 so that a change in the thickness of the phase mask 20 due to a temperature variation is suppressed. Thus, it becomes also possible to make the phase of the transmitted light constant regardless of a change in the ambient temperature.

In the VIPA-type wavelength demultiplexer disposed with the phase mask 20 as described above, a WDM light emitted from one end of the input side optical fiber 1 is converted into a parallel light, and thereafter given with a desired phase difference by the phase mask 20, so that the intensity distribution thereof is converted from the Gaussian distribution into a shape near a rectangular shape. Then, the transmitted light from the phase mask 20 is condensed in the one-dimensional direction by the line focal lens, and passes through the radiation window 13 of the VIPA plate 10 to be incident between the reflective multilayer films 11 and 12. At this time, the intensity distribution of the light condensed by the line focal lens 3 follows the function of sin(y)/y type due to an interference effect. If this condensation image is specifically represented using the coordinate system similar to that shown in FIG. 5, the next formula (11) is obtained.

$$E(y, z) = \frac{\omega_y}{2\sqrt{2\pi}} \frac{\frac{4\pi}{\omega_y}\sin\left(\frac{4\pi y}{2\omega_y}\right)}{\frac{4\pi y}{2\omega_y}} \exp\left(-iKz\left(1 + \frac{y^2}{2z^2}\right)\right) \quad (11)$$

Figure 12:
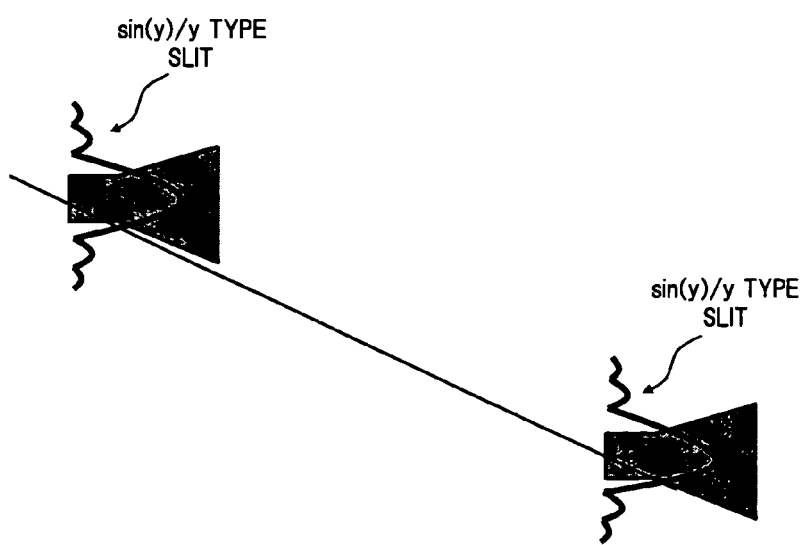
FIG. 12 is a conceptual diagram for explaining a function of a VIPA in one embodiment of the present invention.

In the above formula (11), provided that a change in the phase is sufficiently faster than a change in the amplitude, an amplitude variation can be approximated by a function of position y. This means, as shown in FIG. 12 for example, that the virtual diffraction grating corresponding to the VIPA plate 10 forms a slit having a shape following the function of sin(y)/y type described in the formula (11).

The Fourier transform image of the light represented by the formula (11) becomes a rectangular shape. For the diffraction image of the light transmitted through the VIPA plate 10, the squared absolute value of the complex amplitude amount thereof is represented by the next formula (12).

$$\left|\hat{T}_{out}(k_y)\right|^2 = t^2 \frac{u^2(k_y)}{(1-r)^2 + 4r\sin^2(\phi/2)} \quad (12)$$

In the above formula, $$u(k_y) = \begin{cases} 1 & |k_y| \leq \frac{2\pi}{\omega_y} \\ 0 & |k_y| > \frac{2\pi}{\omega_y} \end{cases}$$

Figure 13:
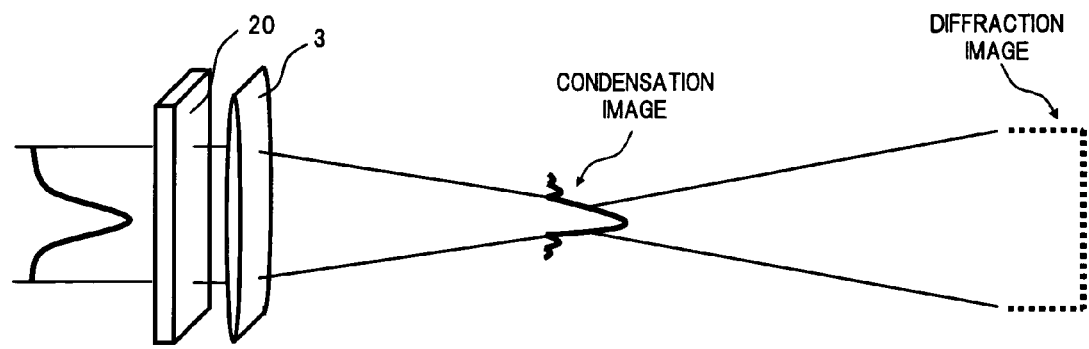
FIG. 13 is a conceptual diagram for explaining an operation in the embodiment of the present invention.

Consequently, according to the VIPA-type wavelength demultiplexer in the present embodiment, as shown in a conceptual diagram of FIG. 13, the light having the Gaussian distribution (left side in FIG. 13) is converted by the phase mask 20 into the light having the intensity distribution near the rectangular shape, so that the condensation image by the line focal lens 3 has the intensity distribution following the function of sin(y)/y type (center in FIG. 13), and in the diffraction image of the emitted light obtained by multi-reflecting the condensation image by the VIPA plate 10, the rectangular intensity distribution assumed as a target is realized (right side in FIG. 13). As a result, it becomes possible to significantly reduce the inter-channel loss deviation between the optical signals of respective wavelengths which are demultiplexed using the VIPA plate 10 (refer to FIG. 11), thereby enabling the realization of a high accurate wavelength demultiplexing function.

In the above embodiment, as the basic configuration of the phase mask, there has been shown one example to which is applied the configuration in which the thickness of the substrate having the uniform refractive index is uneven in spatial. However, in addition to this, it is also possible to apply, for example, a phase mask in which the thickness of the substrate in the optical propagation direction is made constant and the refractive index in the substrate is made uneven in spatial, thereby giving a required phase difference to the transmitted light. To be specific, such a phase mask is capable to be produced by applying a known ion exchange method or the like to form the refractive index profile within the substrate. Further, the optical element for converting the intensity distribution of the light input to the line focal lens 3 is not limited to the phase mask, and it is possible to apply various optical devices (for example, a phase plate, an optical filter and the like) realizing functions equivalent to that of the above phase mask.

Moreover, there has been shown one example in which the phase mask 20 is designed so that the condensation image of the line focal lens 3 follows the function of sin(y)/y type. However, the function f(y) representing the condensation image of the line focal lens 3 is not limited to the sin(y)/y type. Namely, the function f(y) may be a function corresponding to the inverse Fourier transform image of the target diffraction image of the light emitted from the VIPA plate 10, and accordingly, it is possible to appropriately set the target diffraction image in response to the demand to the optical apparatus.

Figure 14:
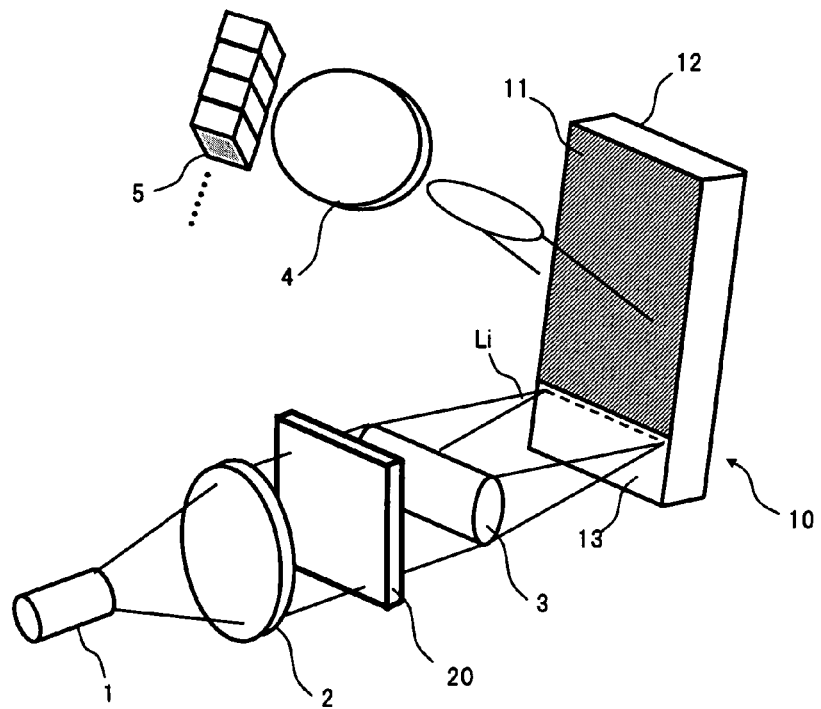
FIG. 14 is a perspective view showing a modified example relating to the embodiment of the present invention.

Furthermore, in the above embodiment, there has been shown the transmission type configuration example in which the multi-reflected lights are emitted from the plane opposite to the plane on which the light from the line focal lens 3 is incident. However, as shown in FIG. 14 for example, it is also possible to apply a reflective type configuration in which the multi-reflected lights are emitted from the plane on the same side of the incident plane. In this case, the reflectance of the reflective multilayer film 11 on the opposite side of the radiation window 13 is made 100%, and the reflectance of the reflective multilayer film 12 on the same side of the radiation window 13 is made lower than 100% (preferably, about 95 to 98%).

In addition, there has been shown the embodiment of the VIPA-type wavelength demultiplexer. However, the use of the present invention is not limited to the wavelength demultiplexer, and can be applied to known various optical apparatuses each of which is applied with a VIPA-type configuration to be provided with a function of demultiplexing a WDM light.

INDUSTRIAL APPLICABILITY

In an optical apparatus provided with a demultiplexing function according to the present invention, an element changing an optical phase is disposed between first and second lenses, so that the intensity distribution of a diffraction image of a light emitted from an optical device of VIPA-type can be formed in a desired shape, thereby achieving the reduction of the inter-channel loss deviation. The optical apparatus realizing such a high accurate demultiplexing function is effective for various uses, for example, a wavelength demultiplexer and the like, and thus has a large industrial applicability.

What is claimed is:

1. An optical apparatus provided with a function of demultiplexing a wavelength division multiplexed light, comprising: a first lens converting an input light into a parallel light; a second lens condensing the parallel light converted by said first lens onto a one-dimensional direction; and an optical device having opposed parallel reflective planes in which the light condensed by said second lens is incident between said respective reflective planes in parallel to the planes, a part of said incident light is transmitted through one of the reflective planes to be emitted while said incident light being multi-reflected by the respective reflective planes, and the emitted lights interfere with each other to form a plurality of optical beams traveling directions of which are different from each other, according to wavelengths, wherein said apparatus further comprises an element changing an optical phase which is disposed between said first and second lenses, and the parallel light converted by said first lens is given to said second lens via said element.

2. An optical apparatus provided with a demultiplexing function according to claim 1, wherein said element changing the optical phase changes a phase of the parallel light converted by said first lens to adjust the intensity distribution of the light to be given to said second lens, so that a condensation image of said second lens approaches an inversed Fourier transformed image of a target diffraction image of the light emitted from said optical device.

3. An optical apparatus provided with a demultiplexing function according to claim 2, wherein said element changing the optical phase changes the phase of the parallel light converted by said first lens to adjust the intensity distribution of the light to be given to said second lens, so that the intensity distribution of the condensation image of said second lens follows a function of sin(y)/y type, provided that a direction vertical to an optical axis direction of the light incident on said optical device from said second lens is y-axis.

4. An optical apparatus provided with a demultiplexing function according to claim 1, wherein said element changing the optical phase is formed of a substrate having the substantially uniform refractive index, and the thickness of said substrate in an optical propagation direction is made uneven in spatial.

5. An optical apparatus provided with a demultiplexing function according to claim 1, wherein said element changing the optical phase is formed of a substrate having the substantially uniform thickness in an optical propagation direction, and the refractive index of said substrate is made uneven in spatial.

6. An optical apparatus provided with a demultiplexing function according to claim 1, wherein said element changing the optical phase is subjected to the non-reflective coating on optical incidence and emission planes thereof.

7. An optical apparatus provided with a demultiplexing function according to claim 1, wherein said element changing the optical phase is provided with a temperature control function for controlling a phase change given to a transmitted light to be constant, regardless of a temperature variation.

8. An optical apparatus provided with a demultiplexing function according to claim 1,
wherein said second lens is a cylindrical lens.

9. An optical apparatus provided with a demultiplexing function according to claim 1,
wherein said second lens is a refractive index profile lens.

10. An optical apparatus provided with a demultiplexing function according to claim 1,
wherein said optical device is configured such that the reflectance of one of the reflective planes thereof is lower than 100% and the reflectance of the other reflective plane is approximately 100%, and includes a radiation window at which the optical reflection can be substantially neglected, on an incident portion of the light condensed by said second lens.

11. An optical apparatus provided with a demultiplexing function according to claim 1, further comprising a third lens condensing the optical beams emitted from said optical device for each wavelength,
wherein the light emitted from an input side optical fiber is given to said first lens, and the light condensed by said third lens is introduced to an output side optical fiber corresponding to each wavelength.

\* \* \* \* \*